United States Patent [19]

Sakamoto

[11] 3,944,198
[45] Mar. 16, 1976

[54] IMPACT ABSORBER
[75] Inventor: Mitsuhiro Sakamoto, Toyota, Japan
[73] Assignee: Aisin Seiki Kabushiki Kaisha, Japan
[22] Filed: Dec. 2, 1974
[21] Appl. No.: 528,744

[30] Foreign Application Priority Data
Nov. 30, 1973 Japan.............................. 48-137984

[52] U.S. Cl.................. 267/116; 267/64 R; 293/70; 188/288
[51] Int. Cl.²............................................ F16F 5/00
[58] Field of Search................. 267/116, 139, 64 R; 293/DIG. 2, 1, 60, 70, 85, 86; 188/288, 316

[56] References Cited
UNITED STATES PATENTS
3,801,087   4/1974   Akaike et al. ......................... 293/70
3,834,686   9/1974   Moritz et al. ........................ 263/116

*Primary Examiner*—James B. Marbert
*Attorney, Agent, or Firm*—Oblon, Fisher, Spivak, McClelland & Maier

[57] ABSTRACT

An impact absorber for an automobile bumper includes a first cylinder having a closed end and filled with a damping liquid. A second cylinder, closed at one end and having a radial partition wall therein, moves within the first cylinder for transmitting an impact force to the damping liquid. A sealing member is secured to the inner part of the first cylinder to define a first chamber with the first and second cylinders. A plurality of throttling ports are provided on the second cylinder for expelling the damping liquid from the first chamber thereby providing a variable orifice effect in cooperation with the sealing member upon movement of the second cylinder for dampening the impact force. A second chamber is provided for receiving the expelled damping liquid. The expelled damping liquid, within the second chamber, urges a piston to slidably move within the second cylinder toward the direction opposite the first chamber. A third chamber is defined by the second cylinder and the piston to include a restoring means for urging the piston toward the first chamber to return the expelled damping liquid to the first chamber after the damping or removal of the impact force such that the impact absorber may dampen successive impact forces.

5 Claims, 1 Drawing Figure

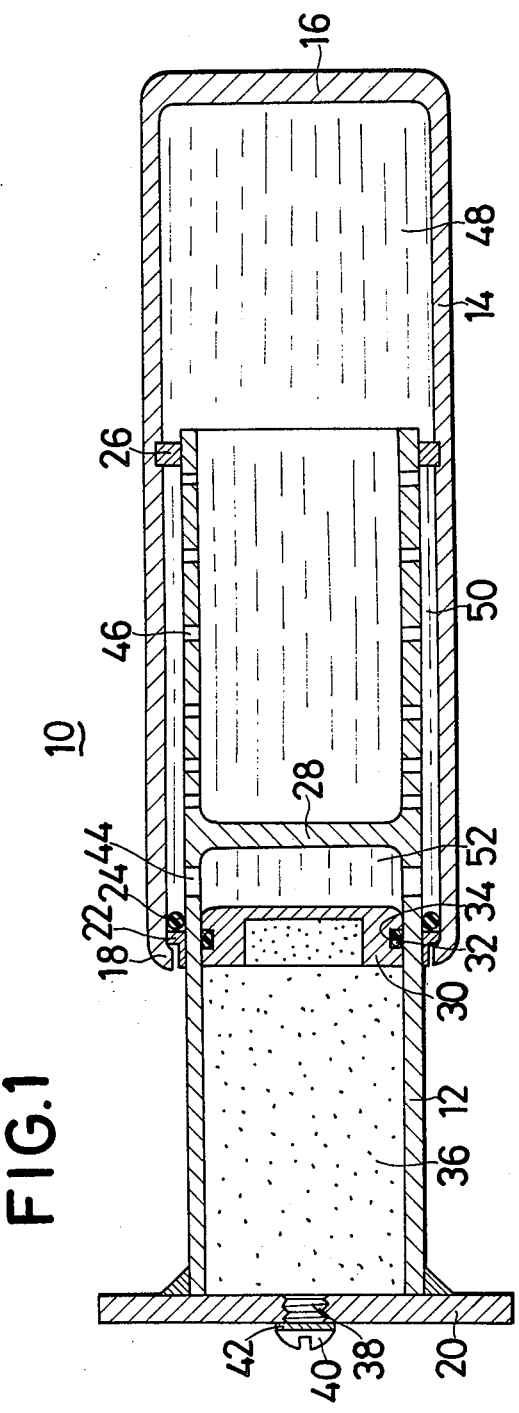

IMPACT ABSORBER

BACKGROUND OF THE INVENTION

1. Field of the Invention:

The present invention relates generally to improvements in impact absorbers and more particularly to an impact absorber utilizing a damping liquid for an automobile bumper.

2. Description of the Prior Art:

An impact absorber including outer and inner tubes and a rod member, such as a piston rod, arranged within the inner tube to which an impact force is directly inflicted is already known to the prior art. In this type of impact absorber, torsion between the inner tube and the rod member is brought out when an impact force acts on the impact absorber at an angle with respect to the axis thereof. Since the inner tube does not slide smoothly into the outer tube, the original function of the impact absorber is not satisfactorily achieved. Another type of impact absorber in which an inner tube serves for the rod member and a plurality of variable orifices are formed through an outer tube in order to improve the efficiency of absorption is also already known to the prior art. In this type of impact absorber, since a plurality of variable orifices are formed through the outer tube, the manufacturing of the outer tube is very difficult. Furthermore, in order to strengthen the outer tube, the dimension of the external form thereof must be enlarged.

SUMMARY OF THE INVENTION

Accordingly, it is an object of the present invention to provide an improved impact absorber adapted for obviating the above-mentioned drawbacks of conventional devices.

It is another object of the present invention to provide an improved impact absorber capable of satisfactorily achieving the original function thereof.

It is still another object of the present invention to provide an improved impact absorber which is easy to manufacture and which is mechanically simple and inexpensive to manufacture.

BRIEF DESCRIPTION OF THE DRAWING

Various other objects, features, and attendant advantages of the present invention will be more fully appreciated as the same becomes better understood from the following detailed description when considered in connection with the accompanying drawing in which:

FIG. 1 is a longitudinal section of a preferred form of the invention showing a self-restoring impact absorber utilizing a damping liquid and a gas.

DETAILED DESCRIPTION OF THE PREFERRED EMBODIMENTS

An impact absorber 10, shown in FIG. 1, includes an inner tube 12 and an outer tube 14. The two tubes 12 and 14 are telescopically fitted into one another so as to be relatively slidably displaceable and such that the outer tube 14 can be wholly displaced over the inner tube 12. The outer tube 14 has a closed end 16 at the right-hand end thereof, as viewed in FIG. 1, which is in turn secured to the body of a vehicle by conventional means (not shown). A rim 18 of the outer tube 14 is turned inwardly around the circumference of outer tube 14. The inner tube 12 is closed at the left hand end thereof, as viewed in FIG. 1, by a flange 20 which may be attached thereto by suitable means, such for example as welding.

An annular stop member 22 is secured to the outer surface of inner tube 12 for limiting the relative expansion of the two tubes 12 and 14 when in the illustrated rest position of the impact absorber 10, wherein stop member 22 is in contact with the inner surface of rim 18 of the outer tube 14. A first sealing ring 24 is secured to the outer surface of inner tube 12 at the position where one part of the outer surface of the first sealing ring 24 is in contact with the right side of stop member 22 so as to prevent any fluid from permeating into the impact absorber 10 or from leaking therefrom.

An annular sealing member 26 is fixedly secured to the inner surface of outer tube 14 and, in the illustrated rest position of the impact absorber 10, the inner surface of the sealing member 26 is in tight contact with the outer surface of the right-hand end of the inner tube 12.

A partition wall 28 is formed integrally with the inner surface of inner tube 12 and is always on the right-hand side of the first sealing ring 24, as viewed in FIG. 1. Inner tube 12 is divided by the partition wall 28 to form a left bore, not numbered, which contains a power piston 30 slidably movable therein. The piston 30 is provided with a second sealing ring 32 in a groove 34 which acts as a seal to prevent any of the fluid from passing around the piston 30.

A chamber 36 is defined by the flange 20, the inner surface of inner tube 12 and the piston 30, in which air or gas is enclosed through a screw hole 38 provided in flange 20. A screw 40 is threaded into the screw hole 38 with a washer 42 positioned between the screw head and flange 20 in order to prevent air or gas from leaking out of the chamber 36. A plurality of apertures 44 are radially formed through the inner tube 12 adjacent the left-hand side of partition 28, as viewed in FIG. 1.

A plurality of throttling ports 46 are formed through the inner tube 12 at the right-hand side of the partition 28, each of the ports 46 having the same diameter.

The distance between each one of the throttling ports 46 and the longitudinally aligned neighboring port is decreased in the direction approaching the partition 28.

A chamber 48 is defined by the outer tube 14, the annular sealing member 26, the inner tube 12 and the partition 28. Chamber 48 communicates with an annular chamber 50 defined by the outer tube 14, the first sealing ring 24, the annular sealing member 26 and the inner tube 12 through the throttling ports 46. A chamber 52 defined by the inner tube 12, the partition 28 and the piston 30 communicates with the annular chamber 50 through the apertures 44. The chamber 48 is filled with damping liquid, such for example as oil, through a filler hole, not shown, whereby the chambers 48 and 52 and the annular chamber 50 are filled with such damping fluid.

The operation of the impact absorber 10 of this invention will now be described. The rest position of the impact absorber 10 is illustrated in FIG. 1. An impact force upon the flange 20 causes the inner tube 12 to move within the outer tube 14 toward the closed end 16 thereof. As a result of such movement, the volume of the chamber 48 is decreased and the pressure therein is increased. The damping liquid within the chamber 48 is thus expelled from the chamber 48 into the annular chamber 50 through the throttling ports 46. In this operation, with the rightward movement of the inner tube 12 the number of throttling ports 46 communicating the chamber 48 with the annular chamber 50 is decreased, by the sealing member 26, whereby a variable orifice effect is caused. The damping liquid squeezed from the chamber 48 into the annular chamber 50 through the throttling ports 46 is further expelled into the chamber 52 through the apertures 44. The increased pressure within the chamber 52 caused by the displacement of the damping liquid causes the piston 30 to move leftwardly, whereby the gas within the chamber 36 is compressed.

As described above,, the impact absorber 10 absorbs the impact acted thereupon by the subsiding forces caused by the variable orifice effect and compression of the gas.

After absorption of the impact force, the increased pressure produced within the gas, due to the decreased volume of the chamber caused by the movement of the piston 30, causes the piston to move back to the initial position thereof expelling the damping liquid from the chamber 52 into the chamber 48 through the apertures 44, the annular chamber 50, and the throttling ports 46, whereby the inner tube 12 moves back to its initial position, shown in FIG. 1, such that the impact absorber 10 may dampen successive impact forces.

Obviously, many modifications and variations of the present invention are possible in light of the above teachings. It is to be understood therefore that within the scope of the appended claims the present invention may be practiced otherwise than as specifically described herein.

What is claimed as new and desired to be secured by Letters Patent of the United States is:

1. An impact absorber comprising:
   a first cylinder having a closed end;
   damping liquid in said first cylinder;
   a second cylinder closed at one end and having a radial partition wall therein, said second cylinder being longitudinally movable within said first cylinder for transmitting an impact force to said damping liquid;
   a sealing member fixedly secured to the inner part of said first cylinder;
   a first chamber defined by the wall and closed end of said first cylinder, the radial partition wall and the portion of said second cylinder on the side of said radial partition wall therein facing inwardly of the first cylinder toward the closed end thereof and said sealing member;
   a plurality of longitudinally aligned throttling ports formed through said second cylinder on the side of said radial partition wall defining said first chamber, said damping liquid being forced through said throttling ports upon movement of said second cylinder to thereby provide a variable orifice effect in cooperation with said sealing member with a self-regulating response to changing impact conditions and to dampen a wide range of impact forces;
   sealable stopping means fixedly secured to the outer part of said second cylinder to limit the relative extension of said first and second cylinders and to prevent said damping liquid from leaking out of said impact absorber;
   at least one aperture formed radially through said second cylinder wall on the closed end side of said radial partition wall;
   a piston slidably movable within said second cylinder in the closed end side thereof;
   a second annular chamber defined by the inner surface of said first cylinder, the outer surface of said second cylinder, said sealing member and said sealable stopping means and communicating with said first chamber through said throttling ports;
   a third chamber defined by the portion of said second cylinder on the side of said radial partition wall therein facing the closed end thereof, said partition wall and said piston and communicating with said second annular chamber through said aperture, said damping liquid within said first chamber being forced through said throttling ports to said second annular chamber and from said second annular chamber through said aperture to said third chamber thereby urging said piston toward the closed end of said second cylinder responsive to an impact force on said closed end of said second cylinder;
   a fourth chamber defined by the portion of said second cylinder between said closed end thereof and said piston; and
   restoring means in said fourth chamber for biasing said piston toward said partition wall to thereby serve as an additional dampening force for dampening said impact force and for returning said damping liquid within said third chamber to said second annular chamber and then to said first chamber after the dampening of said impact force such that said impact absorber may dampen successive impact forces.

2. An impact absorber as set forth in claim 1, wherein each of said throttling ports has the same diameter.

3. An impact absorber as set forth in claim 1, wherein said throttling ports are arranged such that the distance between each one of said ports and the neighboring port is decreased in the longitudinal direction approaching said partition wall.

4. An impact absorber as set forth in claim 1, wherein said aperture is formed adjacent said partition wall.

5. An impact absorber as set forth in claim 1, wherein said restoring means is a gas which remains in gas phase even when compressed.

* * * * *